Sept. 23, 1952 L. M. FRANCIS 2,611,640
CARGO TRAILER
Filed Aug. 30, 1948 2 SHEETS—SHEET 1
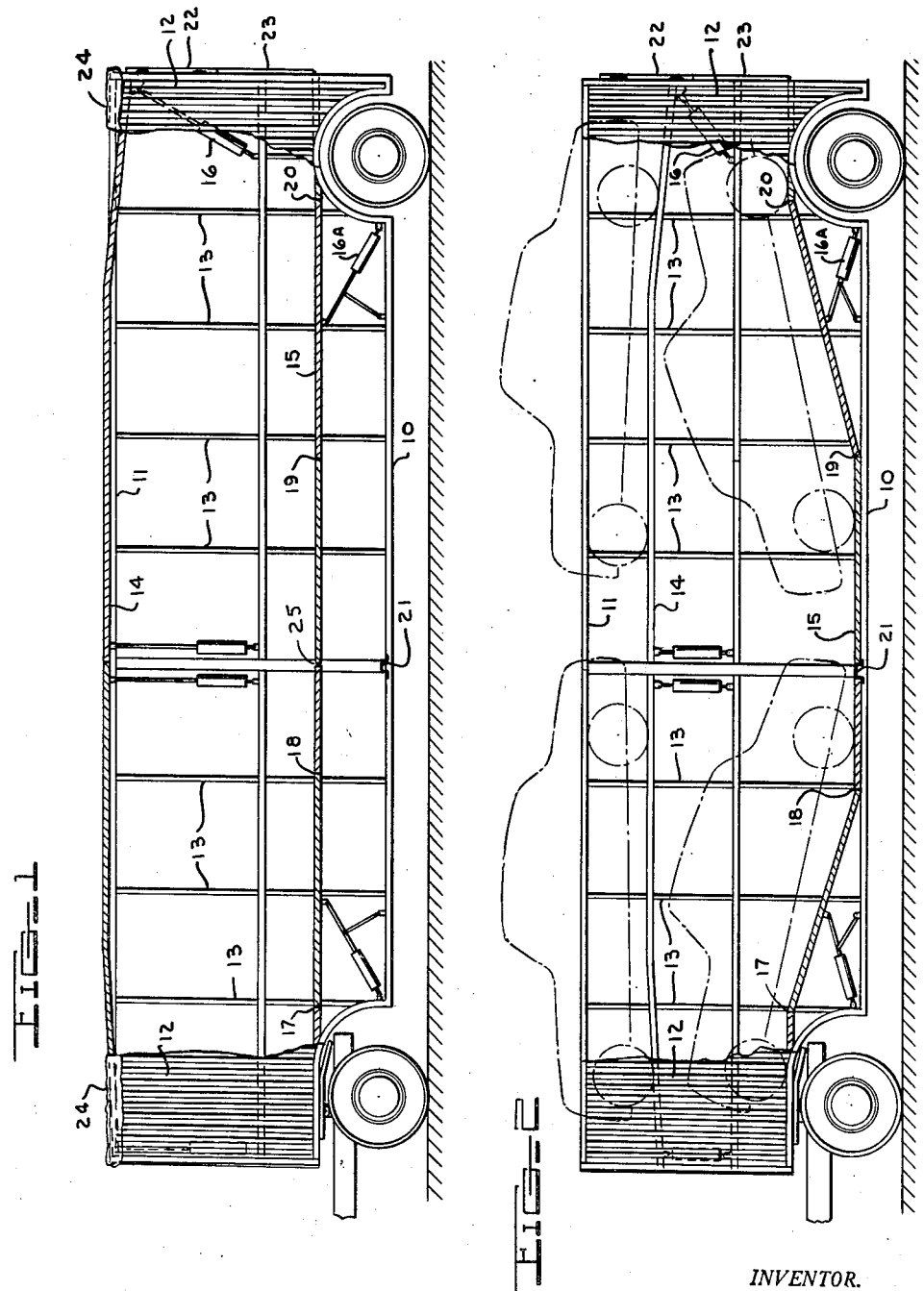
INVENTOR.
LYNN M. FRANCIS
BY
ATTORNEY

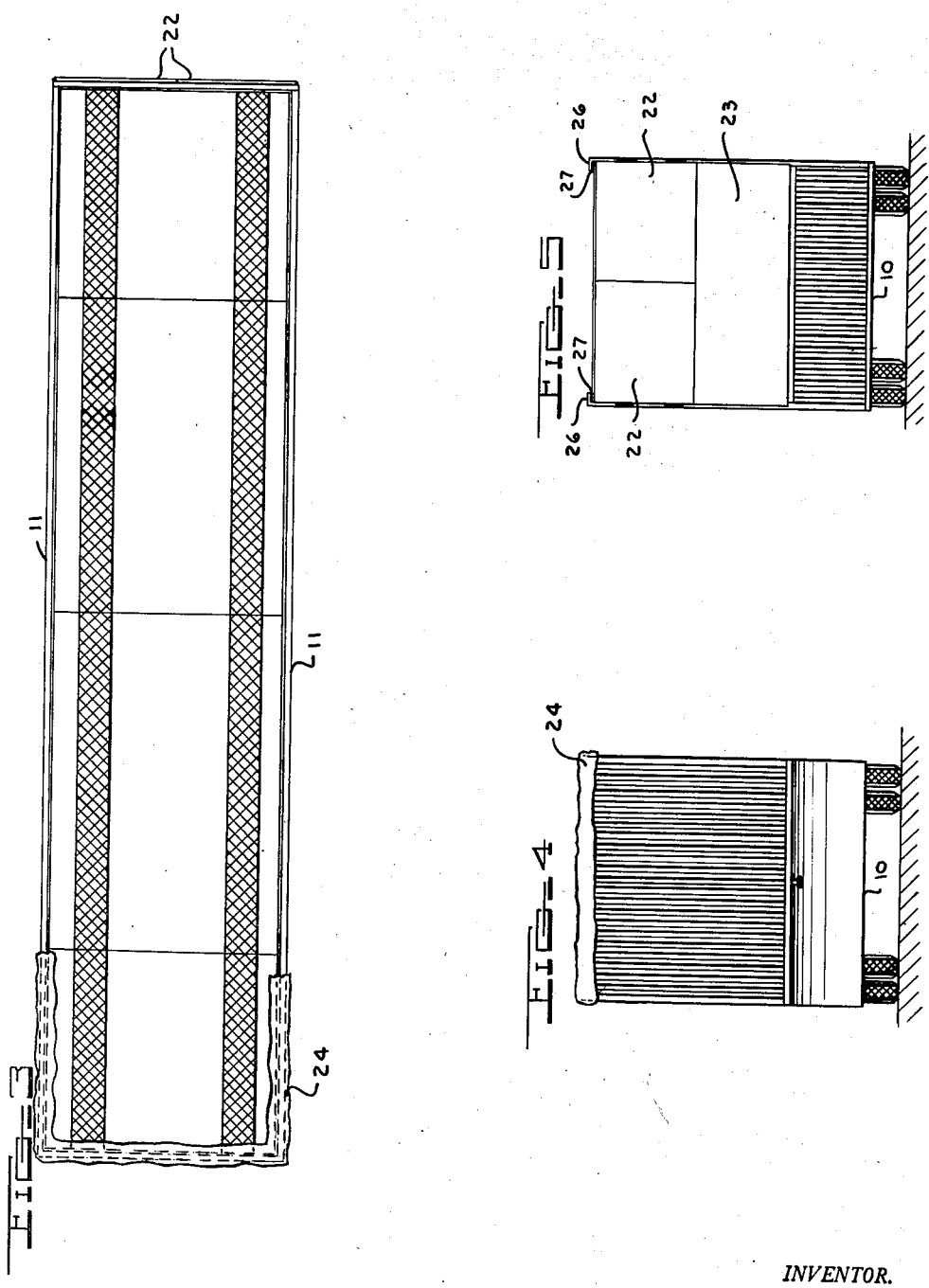

Patented Sept. 23, 1952

2,611,640

UNITED STATES PATENT OFFICE 2,611,640

CARGO TRAILER

Lynn M. Francis, Detroit, Mich.

Application August 30, 1948, Serial No. 46,859

2 Claims. (Cl. 296—1)

The present invention relates to a cargo trailer and in particular to such a cargo trailer which may be used with a drop floor to haul vehicles such as automobiles, and which may be quickly and simply converted to provide a flush floor van for hauling freight.

Vehicle-hauling trailers of conventional construction are extremely limited in their use inasmuch as the space in such trailers is broken up by the tracks which are provided in several angular planes to accommodate the vehicles. One of such conventional trailers, may, for example, make a delivery of new automobiles or tractors from a large industrial city to a smaller city or town. In all probability, there will be no reason to haul vehicles back to the first city, and thus the return trip is made empty.

The cargo trailer of the present invention is designed to provide a readily convertible trailer which may be used selectively to haul vehicles or general cargo. Applicant's trailer is adapted for use as a dropped floor trailer to haul the customary number of angularly disposed vehicles therein. Upon the delivery of said vehicles, the trailer may quickly and easily be converted to a large enclosed flat floor van. Thus, the return trip may be made with a general cargo load which is completely covered and shielded from the weather.

It is a principal object of the present invention to provide a cargo trailer which can be converted quickly and easily from a vehicle-hauling trailer to a spacious, covered freight trailer or van, and vice versa.

Another object of the present invention is to provide a convertible freight van and vehicle-hauling trailer which is of sturdy construction, and which is simple and economical to manufacture.

A further object of the present invention is to provide a convertible freight van and vehicle-hauling trailer which is relatively light and easy to haul.

Other objects of this invention will appear in the following description and appended claims, reference being had to the accompanying drawings forming a part of this specification wherein like reference characters designate corresponding parts in the several views.

In the drawings:

Fig. 1 is a side elevation of the cargo trailer of the present invention adjusted for use as a freight trailer or van, and with part of the wall panel broken away to disclose the construction of the interior of the trailer.

Fig. 2 is a side elevation of the cargo trailer of the present invention adjusted for use as a vehicle-hauling trailer, and with part of the wall panel broken away to disclose the interior of the trailer.

Fig. 3 is a top plan view of the cargo trailer of the present invention.

Fig. 4 is a front elevation of the trailer adjusted for use as a freight van and using a flexible roof covering to form a weatherproof top.

Fig. 5 is a rear elevation of the trailer adjusted for use as a freight van and utilizing a compressible seal and wall flange to form a weatherproof top.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The vehicle tracks provided in the trailer of the present invention are formed as vertically adjustable platforms which are separable at a point approximately half their length instead of two separate track members characteristic of conventional vehicle-hauling trailers. This construction provides a solid deck member adaptable for use as a floor or roof when the divided sections of the platform are abutting. The two sections of the upper track platform are provided at their abutting points with sealing means so that the sections form a weather-tight contact at their said abutting points when in a closed position. This sealing of the middle point of the divided upper track platform insures protection of the inside of the trailer against weather when the said upper track platform is used as a roof member as hereinafter described.

Since the track platforms are divided in the middle to form two sections, each section may be raised or lowered separately and less strain is imposed upon the platform height-adjusting means.

The cargo trailer of the present invention comprises the bottom 10 and the upper rail 11 between which extend the wall panels 12. The panels 12 are reinforced by the members 13. The wall panels are covered with any suitable covering such as lightweight sheet metal, which is preferably corrugated to provide additional reinforcement. Within the trailer, the upper track platform 14 and lower track platform 15 are supported by hydraulic cylinders or jacks 16 and 16A. The lower track platform 15 is hinged at 17, 18, 19 and 20 to allow adjustment. A vertically extending cross member 21 is located across the bottom 10 to provide a locking means for the separated middle portions of the lower track platform 15 when it is in its lowered vehicle-carrying position. The rear of the trailer is provided with conventional tail gates 22 and 23, and the top is provided with a suitable cover such as the canvas 24.

When using the trailer of the present invention as a vehicle-hauling trailer, it is operated as follows:

The tail gates 22 and 23 are opened and the two sections of the upper track platform 14 may be lifted by the hydraulic jacks 16 to the position shown in Fig. 1. The lower track platform is lowered by the hydraulic jacks 16A to the position indicated in Fig. 2. The vehicles are then driven up a loading ramp and onto the lower track platform 15 where they are blocked or secured in position. The middle portion of the lower track platform 15 is divided as here shown and each end thereof is held in place against the cross member 21 and is supported thereby.

The space between the ends of the lower track platform 15 when in their lowered position as shown in Fig. 2 is taken up by the change in the angular alignment thereof when the platform 15 is raised to the horizontal position shown in Fig. 1.

The upper track platform 14 is then lowered to the position indicated in Fig. 2 by the hydraulic jacks 16, and cars are driven onto the said upper track platform 14 from any suitable type of ramp. The tail gates 22 and 23 are closed and the loaded trailer is ready for hauling the vehicles.

The track platforms 14 and 15 are stopped in different positions by any suitable stopping means not shown and are locked in position by any suitable locking means not shown.

By inclining the vehicles on the lower track platform 15 as shown in Fig. 2, it is possible to seat the upper track platform 14 lower in the trailer en route and thus reduce the overall height of the load to conform to height regulations and to provide clearance beneath bridges, viaducts, and the like.

The vehicles are unloaded by adjusting the track platforms with the hydraulic jacks and moving the cars down ramps which are provided for this purpose.

After the vehicles are unloaded, the upper track platform 14 and lower track platform 15 are moved into the positions indicated in Fig. 1. The middle portions of the lower track platform 15 abut as shown at 25 when the said lower track platform 15 is in the raised position. By hinging the lower track platform 15 as shown, the two sections comprising the said platform are long enough to extend against the cross member 21 when in the lowered position, and also are adapted to engage each other so as to form a continuous horizontal platform when in the raised position.

Thus a flat floor member is provided by the lower track platform 15, and the upper track platform 14 is raised and becomes a roof member. The trailer then becomes a spacious van adapted for hauling general freight and cargo. When the freight is loaded onto the van or trailer, a suitable flexible covering 24 is pulled over the roof and tail gates 22 and 23 and then closed to provide a weather-tight body structure.

An alternate method of forming a weather-tight roof is shown in Fig. 5. In this construction, the top edge of the wall panels 12 is bent inwardly at a 90 degree angle as indicated at 26. The top surface of the upper track platform 14 is provided along its edge with a resilient sealing material 27 such for example as a rubber compound. The seal 27 along the top edge of the upper track platform 14 may then be raised by the jacks 16 against the edge 26, thus compressing the seal 27 and forming a weather-tight roof member. In this construction, the upper track platform 14 is formed as a horizontal platform with no angular deviation and is closely spaced from the side wall panels to keep the sealing member as small as possible and thus to reduce the possibility of leakage to the minimum.

It will be seen that the lower floor member includes a central flat floor portion which is parallel to the lower frame of the trailer at all times and fixed spaced flat end floor portions one of which overlies the fifth wheel coupling and the other of which overlies the rear axle of the trailer. The space between the ends of the central flat floor portion and the flat end floor portions is closed by the hinged movable floor portions, one of which extends downwardly and forwardly of the rear axle of the trailer and the other of which extends downwardly and rearwardly of the fifth wheel coupling when the floor is in the lowered position shown in Fig. 2. Due to the hinged construction, the inclined portions become a part of the flat horizontal floor when the central portion is raised as shown in Fig. 1.

Having thus disclosed my invention, what I desire to secure by Letters Patent of the United States is:

I claim:

1. In a cargo trailer adapted for hauling either vehicles or freight and having a bottom therein, a lower platform comprising fixed portions near each end of said trailer and spaced above the bottom thereof, a pair of pivotal sections one mounted to the inner edge of each of said fixed portions for pivotal movement about an axis transverse to the longitudinal axis of said trailer, a cross member disposed in a plane below said fixed sections and mounted adjacent the bottom of the trailer, and means to raise and lower said sections, each of said sections being composed of a pair of units joined together to permit limited pivoting of one unit relative to the other, the free ends of said sections abutting when in the raised position to form a substantially horizontal freight carrying floor for the trailer, and one of the units of each section extending along the bottom of the trailer and against the cross member in the lowered position so that the other unit extends at an angle between said fixed portions and said first named unit to permit vehicles to be carried at an angle on said lower platform.

2. An open top cargo trailer for hauling either vehicles or freight, comprising wall members surrounding the sides, front and rear of said trailer, an upper platform vertically movable within said walls and a lower platform forming a bottom for said trailer, said upper platform being selectively movable to a position adjacent the top edges of said walls to form a top closure for said trailer when used for hauling freight and also being selectively movable to a lowered position spaced below the upper edges of said walls when used for hauling vehicles whereby vehicles may be first placed in position on the lower platform and the upper platform may then be lowered to a point immediately above the vehicle to permit carrying vehicles on the upper platform at a minimum height, said trailer being provided with a fifth wheel coupling and a rear axle and said lower platform comprising fixed floor sections disposed over the fifth wheel coupling and the rear axle respectively and a pivotal floor section pivotally secured to the inner edge of each of said fixed sections, said pivotal sections having their free ends abutting in the horizontal position thereof to form a continuous horizontal floor for the trailer when used for hauling freight, a cross member disposed in a plane below said fixed sections and mounted adjacent the bottom of the trailer, said pivotal sections adapted to pivot to a position such that their free ends abut the said cross member to form an angularly disposed floor for the trailer when used for hauling vehicles, said angular floor permitting the lowering of the vehicles carried on the lower platform and thus permitting the upper platform to be lowered to a maximum extent, thus providing a minimum overall height for the trailer and vehicle.

LYNN M. FRANCIS.

REFERENCES CITED

The following references are of record in the file of this patent:

UNITED STATES PATENTS

| Number | Name | Date |
|---|---|---|
| 1,229,714 | Clark et al. | June 12, 1917 |
| 2,009,149 | Pierce | July 23, 1935 |
| 2,168,069 | Miller | Aug. 1, 1939 |
| 2,202,747 | Roloson | May 28, 1940 |
| 2,432,228 | De Lano | Dec. 9, 1947 |
| 2,492,829 | Baker | Dec. 27, 1949 |
| 2,520,698 | Sniezyk | Aug. 29, 1950 |

FOREIGN PATENTS

| Number | Country | Date |
|---|---|---|
| 295,736 | Great Britain | Feb. 16, 1928 |